UNITED STATES PATENT OFFICE.

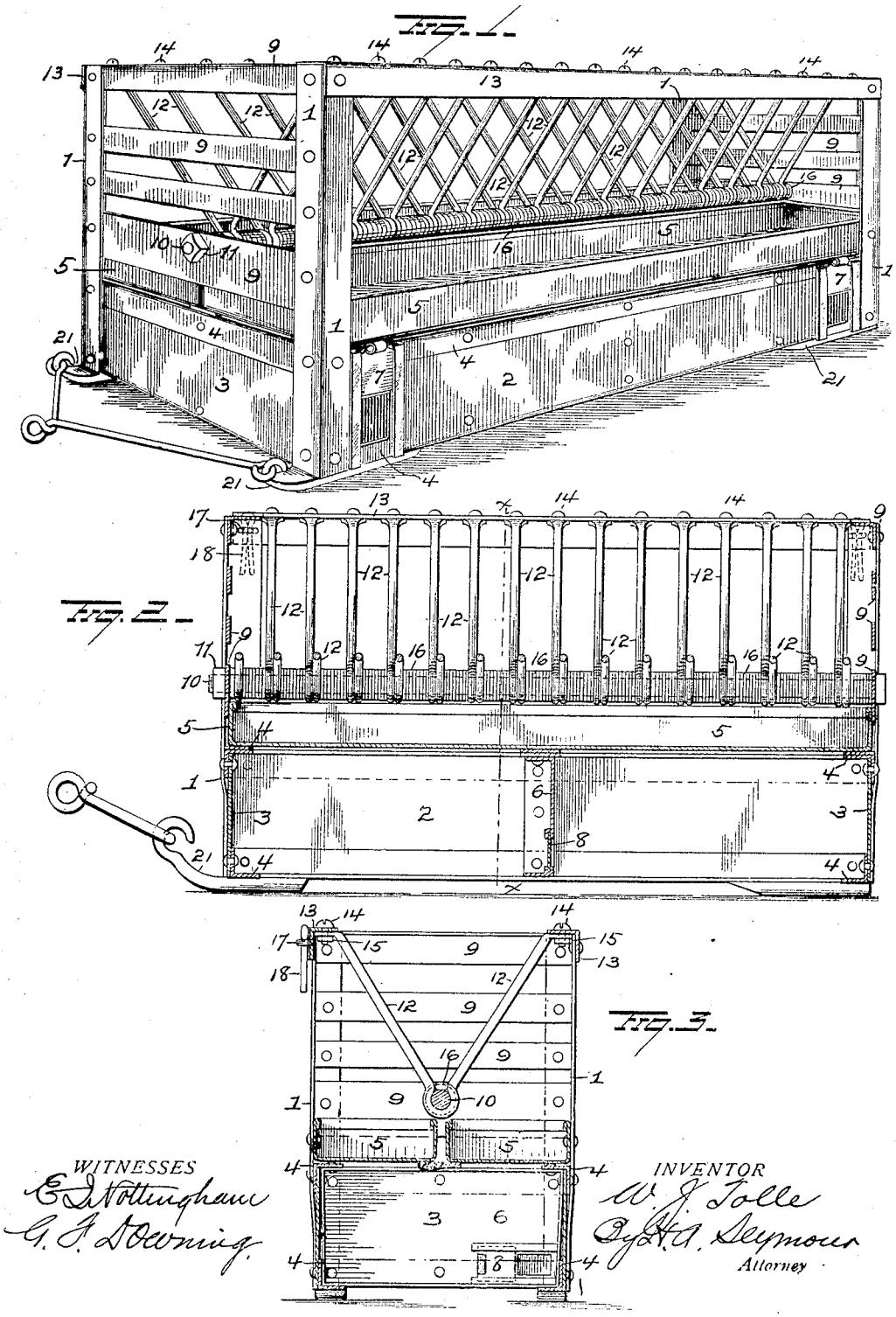

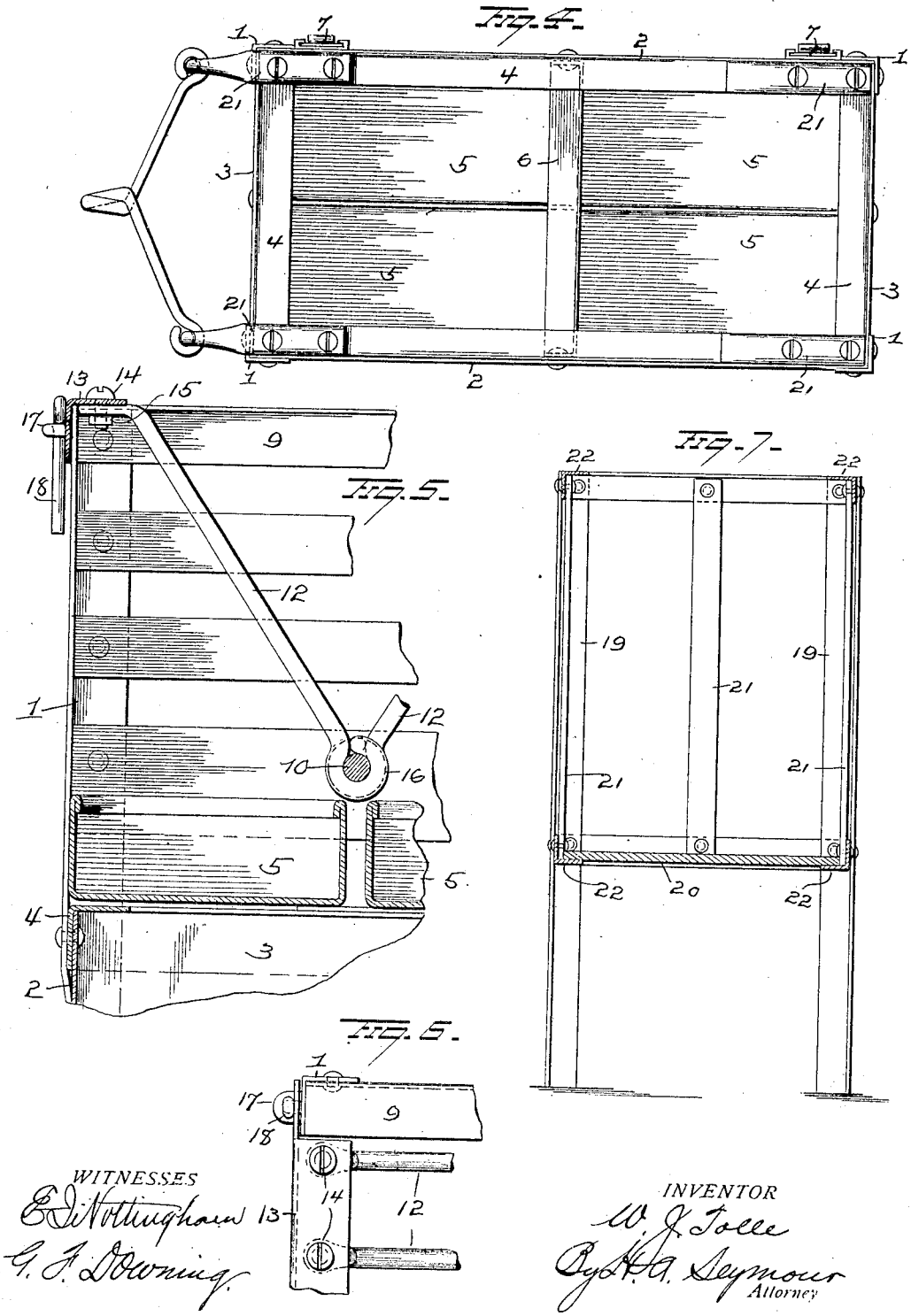

WILLIAM J. TOLLE, OF REESVILLE, OHIO.

COMBINED FEED-RACK, FEED-TROUGH, AND ANIMAL-PEN.

No. 872,032.        Specification of Letters Patent.        Patented Nov. 26, 1907.

Application filed February 12, 1907. Serial No. 357,055.

*To all whom it may concern:*

Be it known that I, WILLIAM J. TOLLE, a resident of Reesville, in the county of Clinton and State of Ohio, have invented certain new and useful Improvements in Combined Feed - Racks, Feed - Troughs, and Animal-Pens; and I do hereby declare the following to be a full, clear, and exact description of the invention, such as will enable others skilled in the art to which it appertains to make and use the same.

My invention relates to improvements in combined feed rack, feed troughs and animal pens, the object of the invention being to provide improvements of this character constructed of metal and made extremely strong and durable, capable of being drawn from place to place and which cannot be injured by exposure to weather.

With these and other objects in view, the invention consists in certain novel features of construction and combinations and arrangements of parts as will be more fully hereinafter described and pointed out in the claims.

In the accompanying drawings, Figure 1 is a perspective view illustrating my improvements. Fig. 2 is a view in longitudinal section. Fig. 3 is a view in cross section on the line $x$—$x$ of Fig. 2. Fig. 4 is a bottom plan view and Fig. 5 is an enlarged fragmentary transverse sectional view: Fig. 6 is an enlarged detail view showing one corner of the rack, and Fig. 7 is a view of a modification of the rack.

1, represents four corner standards composed of angle iron and connected at their lower portions by side plates 2 and end plates 3, securely riveted to the standards 1 and strengthened by angle iron bars 4 at top and bottom, as clearly shown.

Feed troughs 5 located side by side, and secured to the standards 1, constitute the top of a chamber formed by the side and end plates 2 and 3, and said chamber is divided by a partition 6, into two pens for pigs or other animals, and sliding doors 7 close entrances to the pens, and a sliding door 8 closes an opening in partition 6, connecting the two pens. The troughs 5 do not fit tightly together and permit a circulation of air all around them to thoroughly ventilate the pens.

The standards 1 are connected at the ends of the device, by cross bars 9 and one cross bar 9 at each end, is made with an opening to receive a longitudinal rod 10 secured in place by a nut 11.

A series of eye-rods 12 connect the rod 10 with longitudinal bars 13, the latter connecting the upper ends of the standards 1, and the eyes of said rods 12 are located on rod 10 and their upper ends are secured to bars 13 by bolts 14 and nuts 15. The rods 12 are spaced apart by washers 16 and they constitute a hopper to receive hay and the like which can be drawn out by the animals, from the rack thus formed, between the rods 12.

The bar 13 at one side of the rack is perforated at its ends to receive eyes 17 on two of the standards 1 and cotter or other pins 18 are located in said eyes 17 securing said bar 13 in place, and when these pins 17 are removed, the bar 13 at one side of the rack with the rods 12 connected thereto, can be swung down.

Runners 21 are secured to the bottom of the device on which it slides when being moved from place to place, the forward runners 21 being curved upward to receive a draft link to which the draft animals can be connected.

In the modification shown in Fig. 7 four standards 19 support a rectangular rack having a closed bottom 20 and upright slats 21 connect the bottom 20 with horizontal bars 22, the latter connecting the upper ends of the standards.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. A device of the character described, comprising a pen provided with corner posts projecting above the same, troughs secured to said posts and constituting a cover for the pen, and a feed rack over the troughs and supported by said corner posts.

2. In a device of the character described, the combination with two pens, of troughs closing the top of the pens and permitting ventilation between and around the troughs, and a feed rack above the troughs.

3. A device of the character described, comprising a metallic chamber, a partition dividing said chamber into two pens and having an opening, sliding doors for both pens, a door for closing the opening in the partition dividing the pens, feed troughs closing the tops of the pens and a rack above the feed troughs.

In testimony whereof, I have signed this specification in the presence of two subscribing witnesses.

WILLIAM J. TOLLE.

Witnesses:
 GEORGE T. DOUGLASS,
 E. C. LANGDON.